United States Patent
Foster et al.

(10) Patent No.: US 8,418,555 B2
(45) Date of Patent: Apr. 16, 2013

(54) BIDIRECTIONAL, OUT-OF-PLANE, COMB DRIVE ACCELEROMETER

(75) Inventors: Michael Foster, Issaquah, WA (US); Shifang Zhou, Redmond, WA (US)

(73) Assignee: Honeywell International Inc., Morristown, NJ (US)

( * ) Notice: Subject to any disclaimer, the term of this patent is extended or adjusted under 35 U.S.C. 154(b) by 511 days.

(21) Appl. No.: 12/492,915

(22) Filed: Jun. 26, 2009

(65) Prior Publication Data

US 2010/0326191 A1    Dec. 30, 2010

(51) Int. Cl.
*G01P 15/125* (2006.01)

(52) U.S. Cl.
USPC ...................................................... 73/514.32

(58) Field of Classification Search ............... 73/504.12, 73/504.14, 504.15, 504.16, 504.04, 504.02, 73/514.32, 514.17, 514.18
See application file for complete search history.

(56) References Cited

U.S. PATENT DOCUMENTS

| | | | |
|---|---|---|---|
| 4,570,148 A | 2/1986 | Ferroni et al. | |
| 5,908,986 A * | 6/1999 | Mitamura | 73/504.12 |
| 6,250,156 B1 * | 6/2001 | Seshia et al. | 73/504.12 |
| 6,388,300 B1 * | 5/2002 | Kano et al. | 257/419 |
| 6,516,666 B1 * | 2/2003 | Li | 73/504.12 |
| 6,744,173 B2 * | 6/2004 | Behin et al. | 310/309 |
| 6,877,374 B2 * | 4/2005 | Geen | 73/504.14 |
| 6,910,379 B2 * | 6/2005 | Eskridge et al. | 73/504.14 |
| 6,923,061 B2 * | 8/2005 | Tsubaki | 73/514.32 |
| 7,140,250 B2 * | 11/2006 | Leonardson et al. | 73/504.14 |
| 7,146,856 B2 | 12/2006 | Malametz | |
| 7,270,003 B2 * | 9/2007 | Sassolini et al. | 73/514.32 |
| 7,322,240 B2 * | 1/2008 | Robert | 73/514.32 |
| 7,690,254 B2 * | 4/2010 | Pilchowski et al. | 73/514.32 |
| 7,849,742 B2 * | 12/2010 | Wang et al. | 73/514.32 |
| 2006/0156819 A1 | 7/2006 | Robert | |
| 2008/0087081 A1 | 4/2008 | Weber | |

FOREIGN PATENT DOCUMENTS

WO    2009013666 A2    1/2009

* cited by examiner

*Primary Examiner* — Helen C. Kwok
(74) *Attorney, Agent, or Firm* — Lowe Graham Jones PLLC

(57) ABSTRACT

A bi-directional, out-of-plane electrostatic comb drive apparatus including two electrically independent sets of stator comb tines; and a method for fabricating an out-of-plane comb drive with stacked sets of stator comb tines. A first set of stator comb tines is offset from a second set of stator comb tines. A set of rotor comb tines interleaves with both sets of stator comb tines. A first voltage applied to the first set of stator comb tines operates to pull the rotor tines toward the first set of stator comb tines. A second voltage applied to the second set of stator comb tines operates to pull the rotor tines toward the second set of stator comb tines, enabling bi-directional operation. A fabrication method is disclosed that enables fabrication of the first and second sets of stator comb tines that are mechanically and electrically independent and interleaved by the rotor comb tines.

14 Claims, 25 Drawing Sheets

BIDIRECTIONAL, OUT-OF-PLANE, COMB DRIVE ACCELEROMETER

BACKGROUND OF THE INVENTION

Out-of-plane electrostatic comb drives exist where the stator combs pull the rotor combs in only one direction. These type of electrostatic comb drive do not have the ability to pull the rotor combs bi-directionally (up and down) with respect to the stator combs. To improve the linearity and range of their response, bi-directional operation of out-of-plane electrostatic comb drives is desirable. A bi-directional comb drive is applicable in rotational and translational out-of-plane accelerometers, and multi-axis accelerometer mechanisms.

SUMMARY OF THE INVENTION

The present invention provides an example out-of-plane electrostatic comb drive apparatus for bi-directionally driving a proof mass. The example apparatus includes two electrically independent sets of stator comb tines located proximate to rotor tines on a proof mass.

In an exemplary embodiment, a proof mass includes a plurality of rotor comb tines at one edge. A plurality of first stator comb tines is interleaved with the plurality of rotor comb tines such that the plurality of first stator comb tines is offset from the plurality of rotor comb tines. Furthermore, a plurality of second stator comb tines is interleaved with the plurality of rotor comb tines, such that the plurality of second stator comb tines is offset from both the rotor comb tines and the plurality of first stator comb tines.

In one aspect of the present invention, the plurality of first and plurality of second stator comb tines are substantially aligned with one another in the out-of-plane direction.

In another aspect of the invention, the out-of-plane comb drive device is attached to a controller, wherein a first voltage applied by the controller to the plurality of first stator comb tines operates to pull the rotor tines toward the plurality of first stator comb tines. A second voltage applied by the controller to the plurality of second stator comb tines operates to pull the rotor tines toward the plurality of second stator comb tines, in a direction opposite to that pulled by the plurality of first stator comb tines. The controller is operable to apply a voltage to the plurality of first or second stator comb tines to rebalance a force due to rotational torque of the proof mass generated in response to an out-of-plane acceleration of the proof mass as sensed by a sensing component, such as capacitive pickoffs. The controller is operable to determine the amount of acceleration based upon the voltage required to apply the appropriate rebalancing force.

In accordance with a method for fabricating the out-of-plane comb drive, an etchable material is removed from an etchable layer by a first etching process to form a first vertical channel pattern in the etchable layer. Additional etchable material is then removed from the etchable layer by the same first etching process to form at least one vertical passageway through a portion of the etchable layer. An oxide layer is then applied to the exposed faces of the patterned etchable layer. By a second etching process, even further etchable material is removed from the bottom of at least one vertical passageway, forming a cavity, and connecting the bottom of the vertical passageway with the oxide layer. With removal of the oxide layer, that portion of remaining etchable layer surrounding the vertical passageway is freestanding, except for a mechanical connection to a stator base, thereby forming at least one first stator comb tine. Flipping the etchable layer, mounting a handle layer, and etching a second vertical channel pattern, at least one second stator comb tine is formed that is mechanically and electrically separated from the first stator comb tine.

A benefit of an electrostatic comb drive device including two independently controlled sets of stator combs is that the comb drive device can pull the rotor combs in either out-of-plane direction (up or down).

BRIEF DESCRIPTION OF THE DRAWINGS

Preferred and alternative embodiments of the present invention are described in detail below with reference to the following drawings:

FIGS. 5-1 thru 5-3 are x-ray views of the components of the example bi-directional out-of-plane electrostatic comb drive of FIG. 3;

FIGS. 6-1 thru 6-20 show in step-by-step cross-sectional views the process flow for fabricating a bi-directional out-of-plane comb drive.

DETAILED DESCRIPTION OF THE PREFERRED EMBODIMENT OF THE INVENTION

Figure 1:
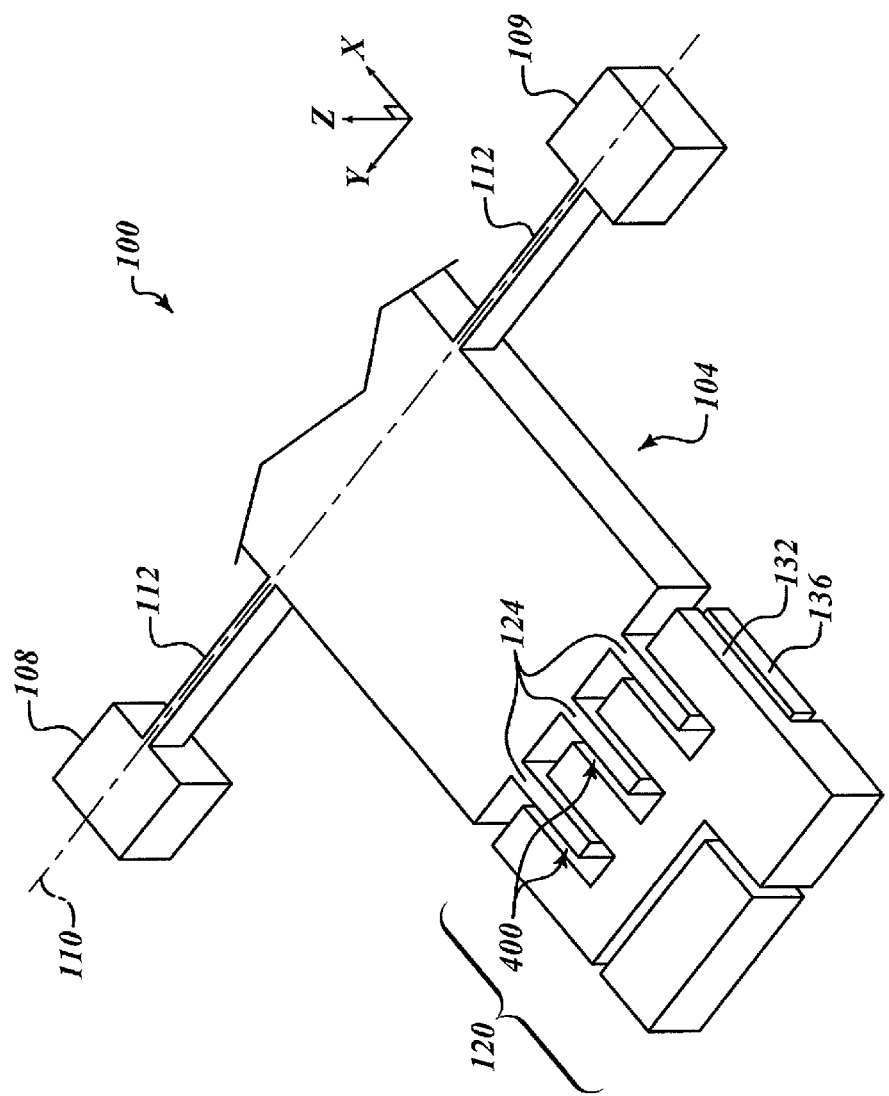
FIG. 1 shows a top-side perspective view of an example bi-directional out-of-plane electrostatic comb drive.

FIG. 1 shows a top-side perspective view of a portion of an example bi-directional out-of-plane electrostatic comb drive accelerometer 100. The bi-directional out-of-plane electrostatic comb drive 100 includes a proof mass 104, first and second anchors 108 and 109, flexures 112, a stator 120, rotor tines 124, an upper row of stator tines 132 and a lower row of stator tines 136. The bi-directional out-of-plane electrostatic comb drive 100 is fabricated using micro-electromechanical systems (MEMS) technologies.

The proof mass 104 is suspended above a substrate (not shown) so that the proof mass 104 is free to rotate about an illustrated axis of rotation 110. The proof mass 104 is suspended from the first anchor 108 and the second anchor 109 by the flexures 112. The first anchor 108 and the second anchor 109 are bonded to the substrate (not shown). The flexures 112 substantially limit movement of the proof mass 104 in the X and Y axes, yet permit rotation in the Z direction (about the Y axis) in response to an out-of-plane acceleration.

The plurality of symmetrically arranged rotor comb tines 124 are formed along a first end of the proof mass 104. Additional symmetrically arranged rotor comb tines 124 can also be formed along an opposing second end of the proof mass 104 (not shown in FIG. 1). For illustrative purposes, three rotor comb tines 124 are illustrated, but in practice many more rotor comb tines 124 would be used.

The stator 120 includes two rows of the stator comb tines: the upper stator comb tines 132 and the lower stator comb tines 136. Additional symmetrically arranged upper and lower stator comb tines 132, 136 can also be formed proximate to the rotor comb tines 124 at the opposing second end of the proof mass 104 (not shown in FIG. 1). For illustrative purposes, only four upper comb tines 132 and one lower comb tine 136 are shown. In practice many stator comb tines would be used.

In the exemplary embodiment, the stator 120 is bonded to the substrate (not shown) such that the upper and lower stator comb tines 132, 136 are held in a fixed position relative to the rotor tines 124. The two rows of stator comb tines interleave with the rotor comb tines 124 with a gap 400 separating the upper and lower stator comb tines 132, 136 from the rotor comb tines 124. The gap 400 provides at least two functions. First, the gap 400 eliminates frictional contact between adjacent stator and rotor comb tines 124, 132, 136 so that the proof mass 104 is free to rotate about its rotation axis 110 in response to linear accelerations along the Z axis. Second, the separation between adjacent stator and rotor comb tines 124, 132, 136 defined by the gap 400 allows a capacitance to exist when a potential difference is applied across either row of stator comb tines 132, 136 and the rotor comb tines 124.

The capacitance across the gap 400 is a function of the area of overlap between the opposing faces of the rotor and stator tines 124, 132, 136. Because the proof mass 104 can rotate in response to linear accelerations along the Z axis, the area of overlap in the rotor and stator tines 124, 132, 136 can vary. As the area of overlap varies, so does the value of the capacitance across the gap 400. Measurement of this capacitive value is used in a feedback loop (not shown) to determine the level of voltage to apply to the rotor and stator tines 124, 132, 136 to maintain the proof mass 104 in an approximately fixed position. An example of the method is taught in related U.S. patent application Ser. No. 12/355,561, which is hereby incorporated by reference.

Figure 2:
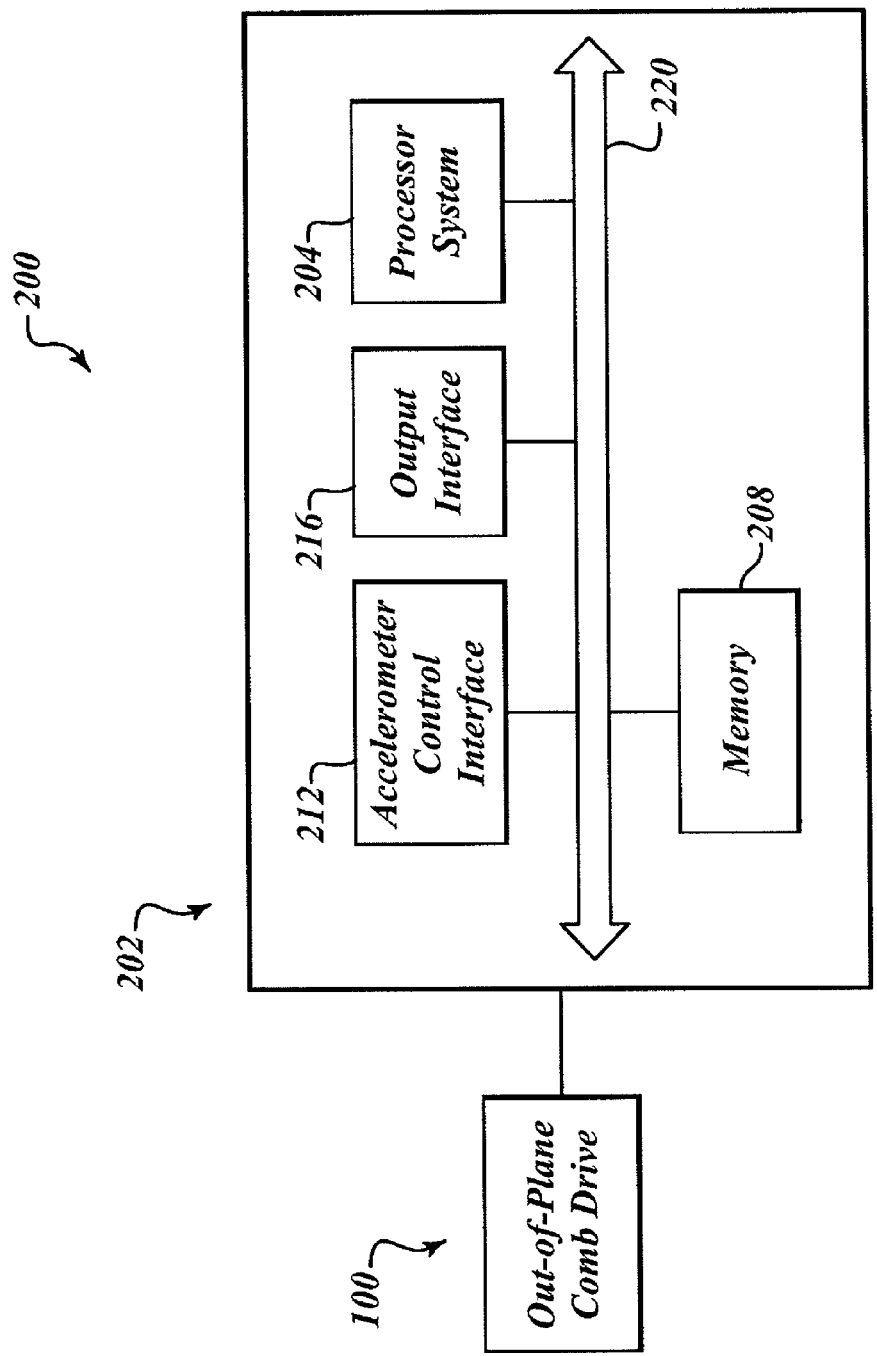
FIG. 2 shows a block diagram of an example bi-directional out-of-plane electrostatic comb drive accelerometer.

FIG. 2 shows an example bi-directional out-of-plane electrostatic comb drive accelerometer 200, including the out-of-plane comb drive 100 and a linear drive accelerometer controller 202. The linear drive accelerometer controller 202 is communicatively coupled to the out-of-plane comb drive 100 by a data interface. The linear drive accelerometer controller 202 includes a processor system 204, a memory 208, an accelerometer control interface 212, an output interface 216, and a communication bus 220. The processor system 204, the memory 208, the accelerometer control interface 212, and the output interface 216 are coupled to the communication bus 220, thereby providing connectivity between the above-described components. In alternative embodiments of the linear drive accelerometer controller 202 the above-described components may be communicatively coupled to each other in a different manner. For example, one or more of the above-described components may be directly coupled to the processor system 204 or may be coupled to the processor system 204 via intermediary components, not shown.

The memory 208 of linear drive accelerometer controller 202 stores data and parameters for controlling the out-of-plane comb drive 100, and for determining the linear acceleration experienced by the out-of-plane comb drive 100. The accelerometer control interface 212 is electrically coupled to the out-of-plane comb drive 100.

In operation, an out-of-plane linear acceleration along the Z axis of FIG. 1 seeks to rotate the pendulous proof mass 104. However a control loop (not shown) applies an externally generated voltage difference across the stator 120 and the proof mass 104 that counteracts the torsional forces caused by the linear acceleration. The applied voltage compensates for the experienced linear acceleration, maintaining the proof mass 104 in a fixed position. The net effect is that the position of the proof mass 104 is substantially fixed.

Figure 3:
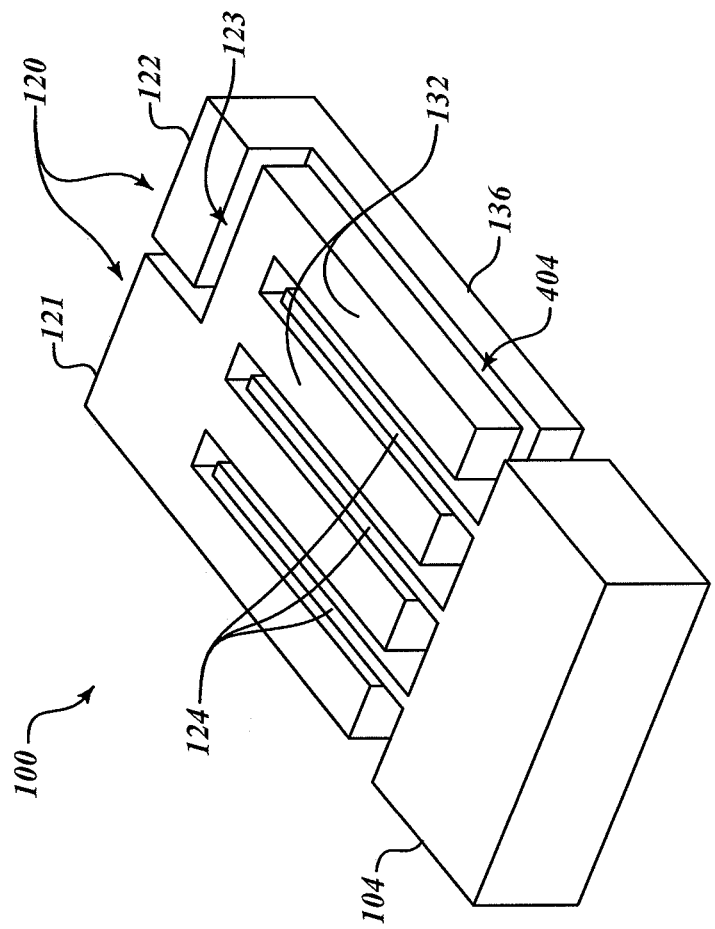
FIG. 3 shows a close-up perspective view of an example bi-directional out-of-plane electrostatic comb drive.

In FIG. 3, an example bi-directional out-of-plane electrostatic comb drive 100 includes the rotor tines 124, the upper stator tines 132, the lower stator tines 136, an upper stator tine base 121, a lower stator tine base 122 and an upper/lower stator tine gap 404. The plurality of upper stator tines 132 are rigidly mounted to the upper stator base 121 and the plurality of lower stator tines 136 are rigidly mounted to the lower stator base 122. The upper and lower stator tines 132, 136 are substantially stacked, one above the other, separated by the upper/lower stator tine gap 404. The length and width dimensions of the upper stator tines 132 and the lower stator tines 136 are substantially similar to one another, and the upper and lower stator tines 132, 136 are substantially aligned vertically.

The rotor tines 124 are spaced and positioned to interleave with the stacked sets of the upper and lower stator tines 132, 136. The substantial alignment of the upper and lower stator tines 132, 136 allows the rotor tines 124 to interleave with the stator tines with a minimal gap 400 between the rotor tines 124 and upper and lower stator tines 132, 136.

The thickness of the upper and lower stator tines 132, 136, as measured in the Z direction, can vary between the upper and lower stator tines 132, 136, or may be the same.

The upper stator tine base 121 and the lower stator tine base 122 are substantially interlocked, albeit with a vertical gap 123 separating the upper and lower stator bases 121, 122. The vertical gap 123, in combination with the upper/lower stator tine gap 404, separates the upper and lower stator bases 121, 122 at every point, maintaining mechanical and electrical isolation between the upper and lower stator bases 121, 122. The upper and lower stator bases 121, 122 do have mechanical and electrical connections to a housing substrate component.

The electrical isolation between the upper and lower stator tines 132, 136 allows the polarity of each row of stator tines 132, 136 to be independently controlled. Therefore, for example, the voltage on the upper stator tines 132 can be used to pull the rotor tines 124 upward, but then the voltage on the lower stator tines 136 can be changed to pull the rotor tines 124 back downward.

Figure 4:
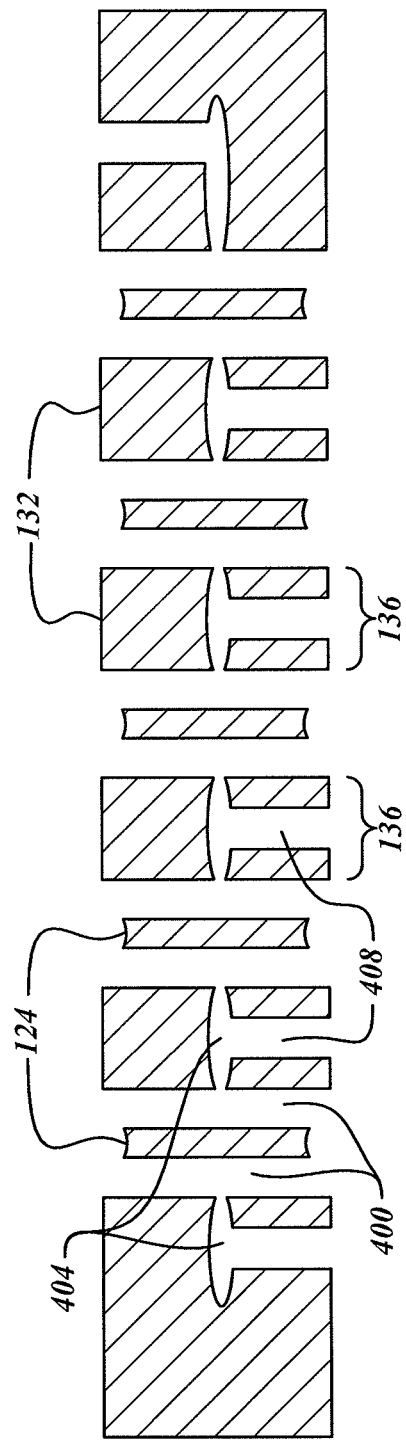
FIG. 4 shows a cross-sectional view of an example bi-directional out-of-plane electrostatic comb drive.

In FIG. 4, the upper and lower stator tines 132, 136 of the bi-directional out-of-plane electrostatic comb drive 100 are visibly separated by the upper/lower stator tine gap 404. The upper/lower stator tine gap 404 maintains electrical isolation between the row of upper stator tines 132 and the row of lower stator tines 136.

In each of the lower stator tines 136 exists a passageway 408 that connects the upper/lower stator tine gap 404 with the outside face of the lower stator tines 136. The passageway 408 exists to enable fabrication of the out-of-plane electrostatic comb drive 100, specifically to enable separation of the upper/lower stator tine gap 404 by an etching process. During one step of fabrication, the previously existing passageway 408 allows etchant to travel through each of the lower stator tines 136 to reach the interior area of the not-as-of-yet separated upper and lower stator tines 132, 136. Although there appears to be two lower stator tines 136 for each upper stator tine 132, the narrower lower stator tines 136 in FIG. 4 are electrically and mechanically connected where they mount to the lower stator base 121.

Figures 2, 5:
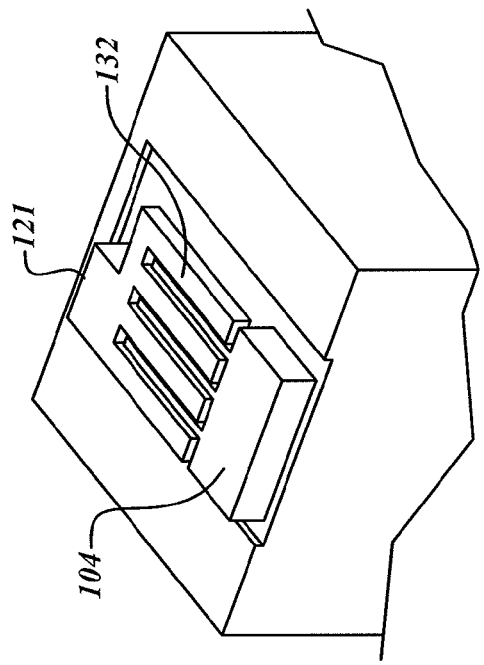
Figures 1, 5:
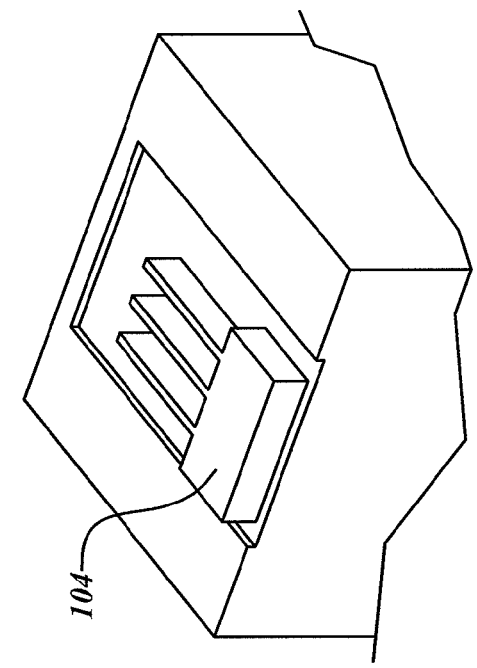
Figures 3, 5:
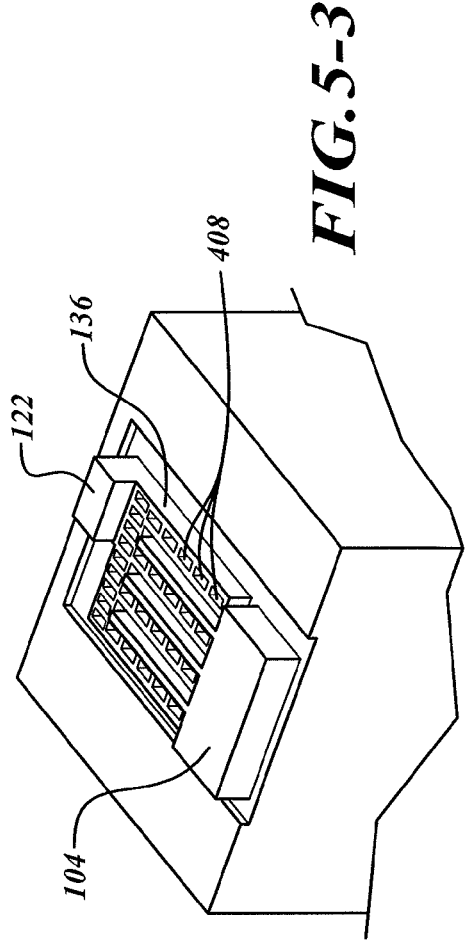

FIGS. 5-1 thru 5-3 illustrate partial x-ray views of components of an example embodiment of the bi-directional out-of-plane electrostatic comb drive 100 of FIG. 1. In FIG. 5-1, the plurality of rotor tines 124 are rigidly mounted to the proof mass 104. In FIG. 5-2, the upper stator tines 132 are rigidly mounted to the upper stator base 121. In FIG. 5-3, the lower stator tines 136 are mounted to the lower stator base 122. The passageways 408 allow etchant to access from the bottom face of the lower stator tines 136 the interior area of the not-as-of-yet separated upper and lower stator tines 132, 136.

In FIGS. 6-1 thru 6-19, an example process flow 490 for fabricating an example bi-directional out-of-plane comb drive is shown in step-by-step cross-sectional and perspective views. Note that cross-sectional and perspective views are representative, and therefore cross-sectional views are not necessarily in agreement with perspective views, and vice-versa.

Figures 1, 6:
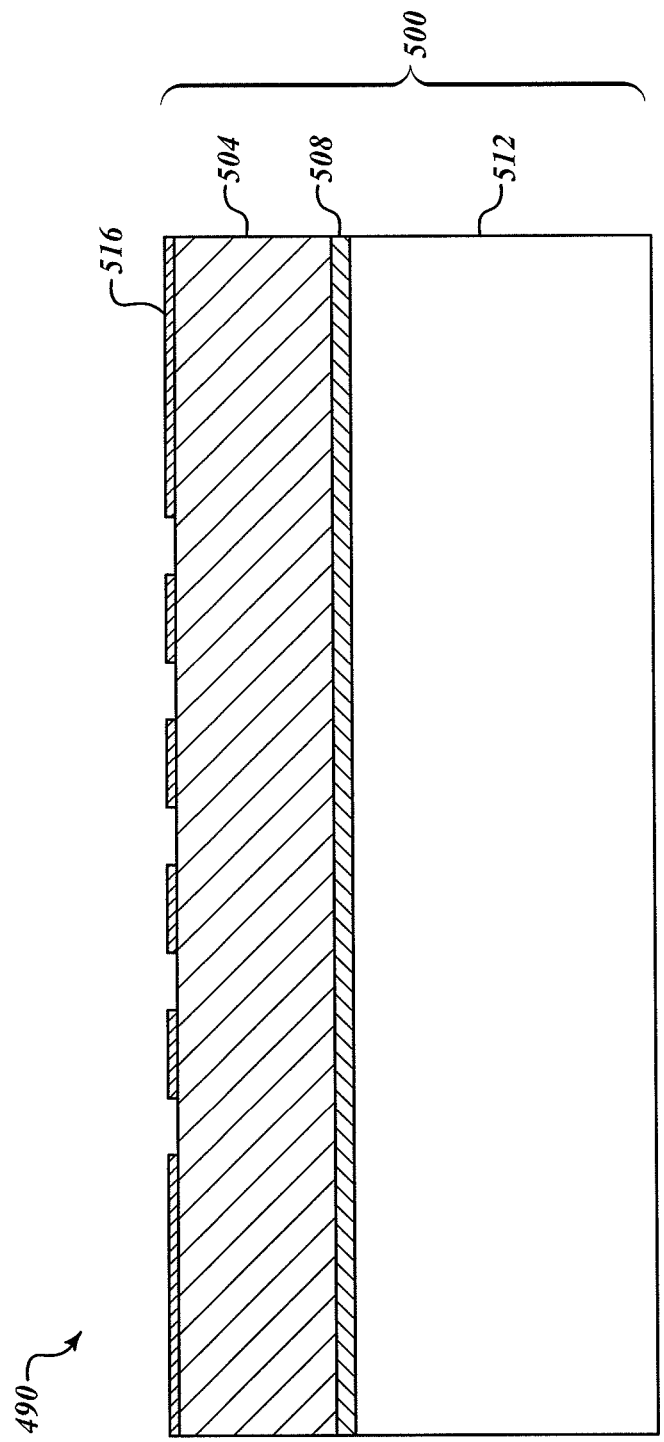
Figures 2, 6:
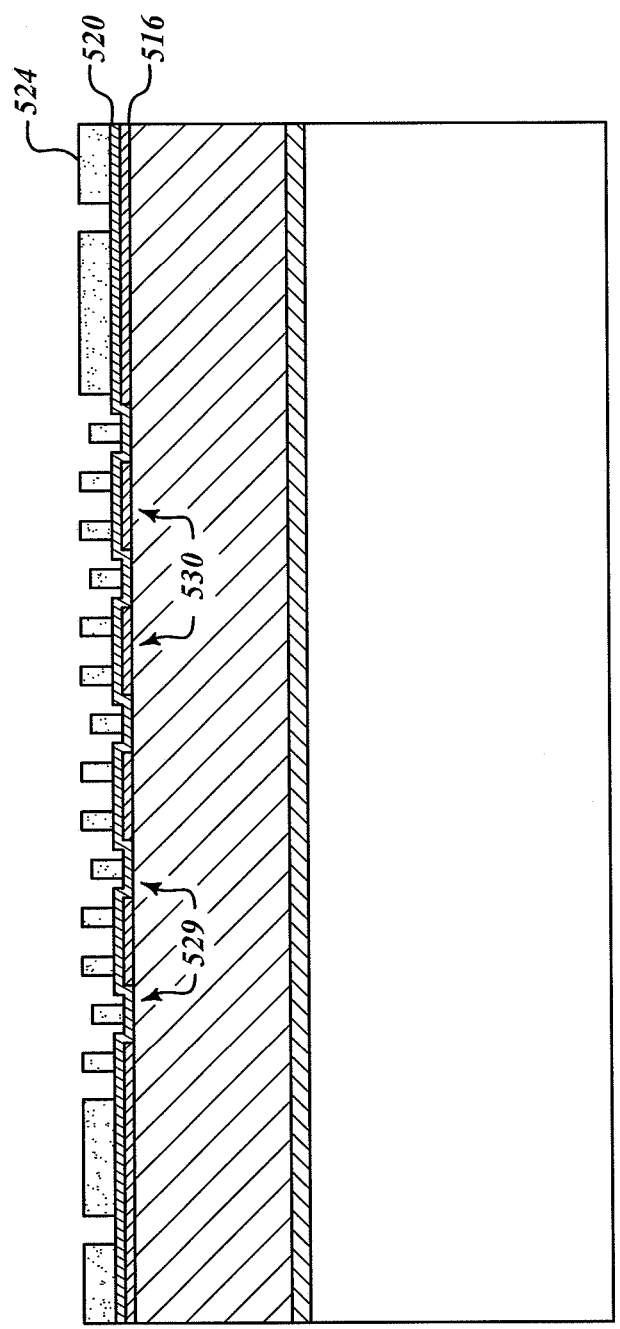
Figures 3, 6:
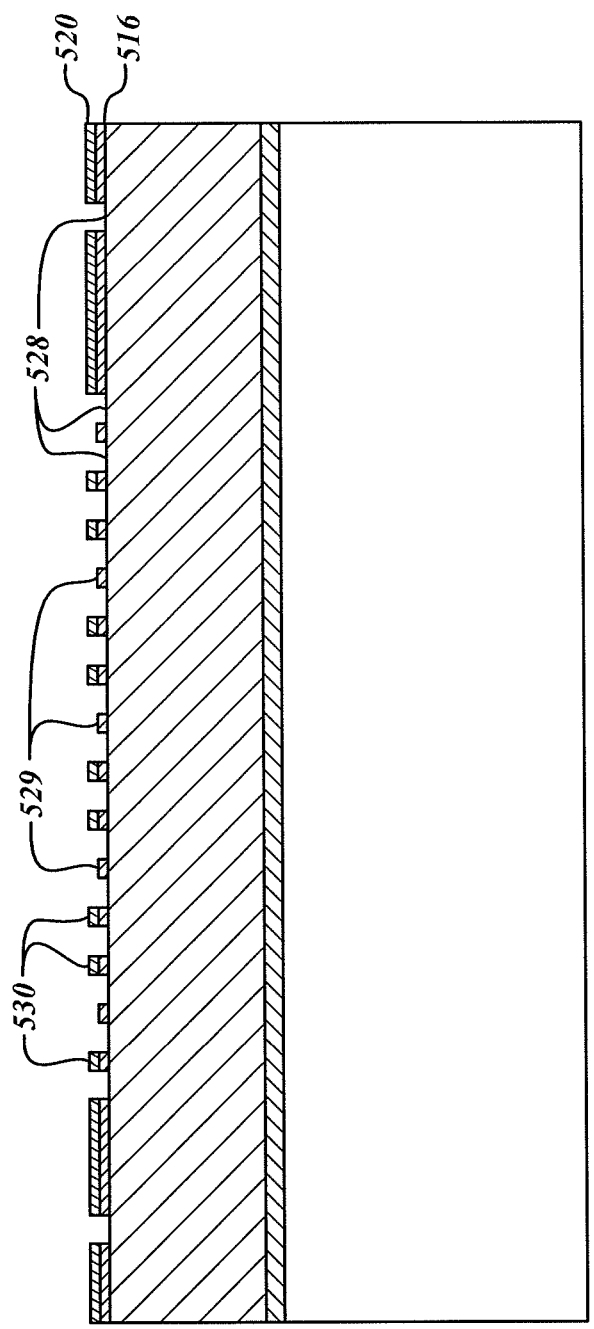
Figures 4, 6:
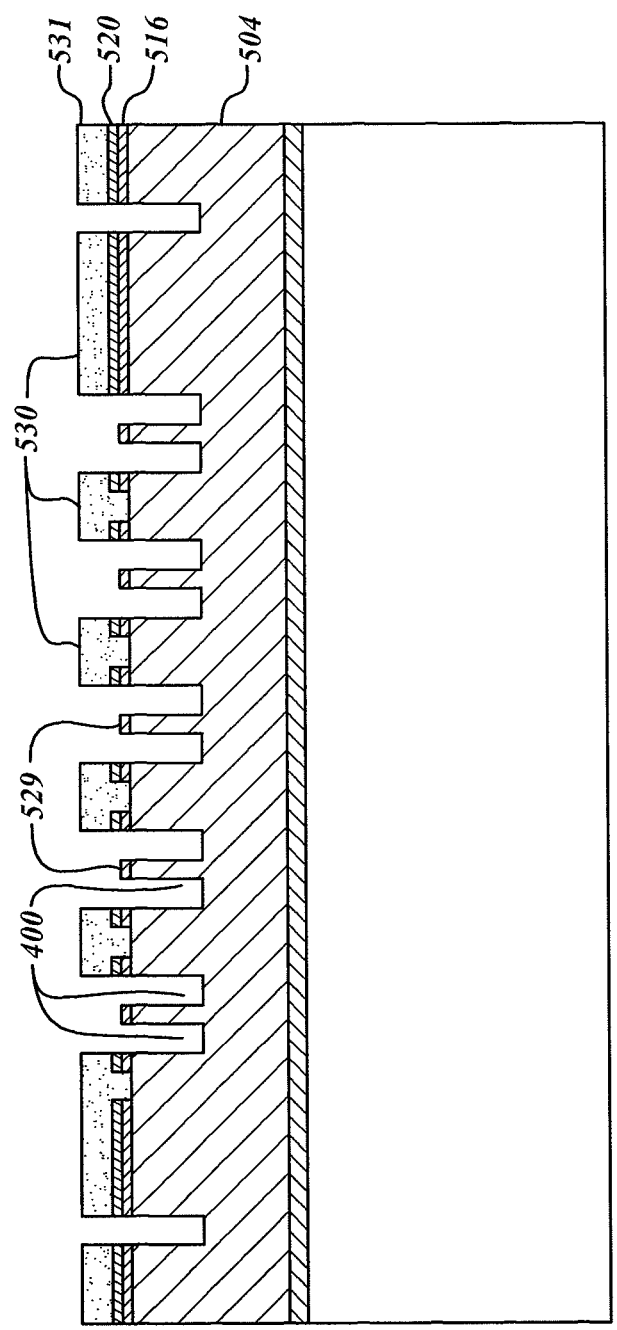
Figures 5, 6:
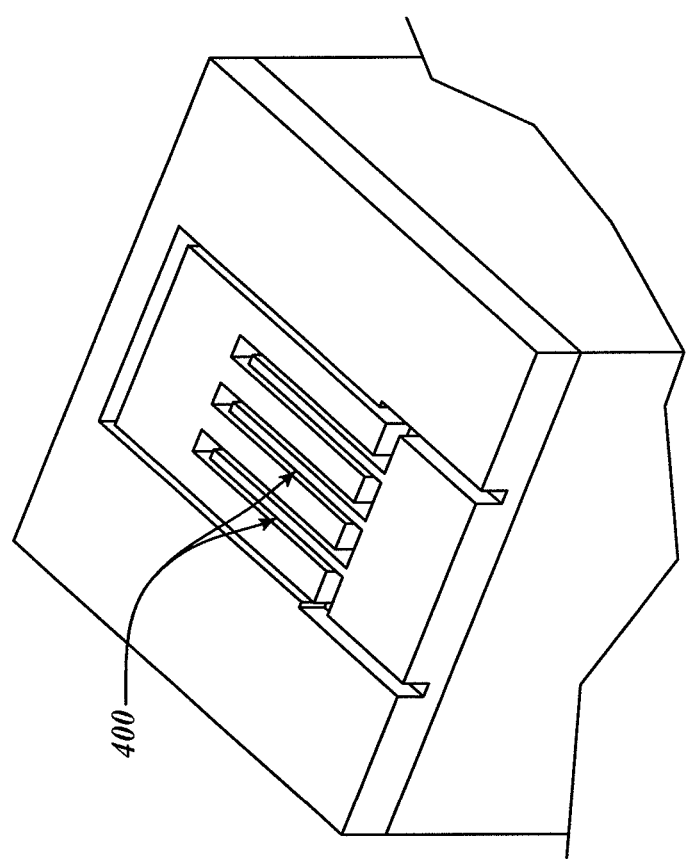
Figure 6:
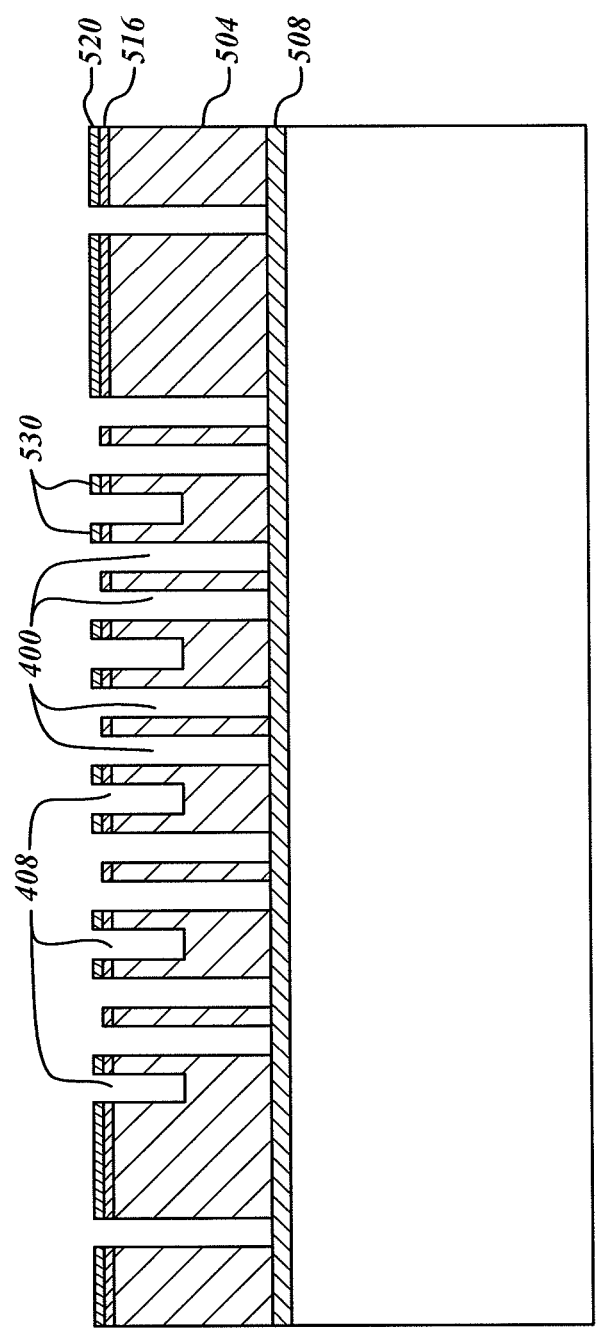

The example process flow 490 begins with a bare silicon-on-insulator wafer 500, including a silicon layer 504, an insulator layer 508 and a first handle layer 512, typically formed of the same material as the silicon layer 504. As shown in FIG. 6-1, a first oxide layer 516 is applied to the silicon layer 504. The first oxide layer 516 is subsequently patterned in a first oxide etch using processes familiar in the art of MEMS fabrication.

Next at a FIG. 6-2, a second oxide layer 520 is applied over the first oxide layer 516. The deposition of the second oxide layer 520 over the previously patterned first oxide layer 516 leads to regions of single oxide layer thickness 529 and regions of double oxide layer thickness 530. A first photoresist layer 524 is applied to the second oxide layer 520. The first photoresist layer 524 is subsequently patterned using a screen printing or other fabrication technique common in the art of MEMS fabrication.

Next at a FIG. 6-3, areas of the first and second oxide layers 516, 520 exposed through the patterned first photoresist layer 524 (not shown) are removed by a second oxide etch. After the second oxide etch, the first photoresist layer 524 (not shown) is also removed. In areas shielded by the first photoresist layer 524 (not shown), the regions of single oxide layer thickness 529 and the regions of double oxide layer thickness 530 formed in the oxide application of FIG. 6-2 still remain.

Next at a FIGS. 6-4 and 6-5, a second photoresist layer 531 is applied to the patterned first and second oxide layers 516, 520. The second photoresist layer 531 is itself patterned so that the regions of double oxide layer thickness 530, and the nearby regions of bare silicon 504 between them, are shielded. The regions of single oxide layer thickness 529, and the nearby regions of bare silicon 504 on each side of the single oxide layer thickness regions 529, are exposed. Next, areas of the silicon layer 504 unshielded by either the second photoresist layer 531 or the first oxide layer 516 are removed by a first timed deep reactive ion etch (DRIE) to a depth approximately one half the thickness of the silicon layer 504. This step etches the portion of the gap 400 that eventually separates the rotor tines 124 from the lower stator tines 136.

Figures 6, 7:
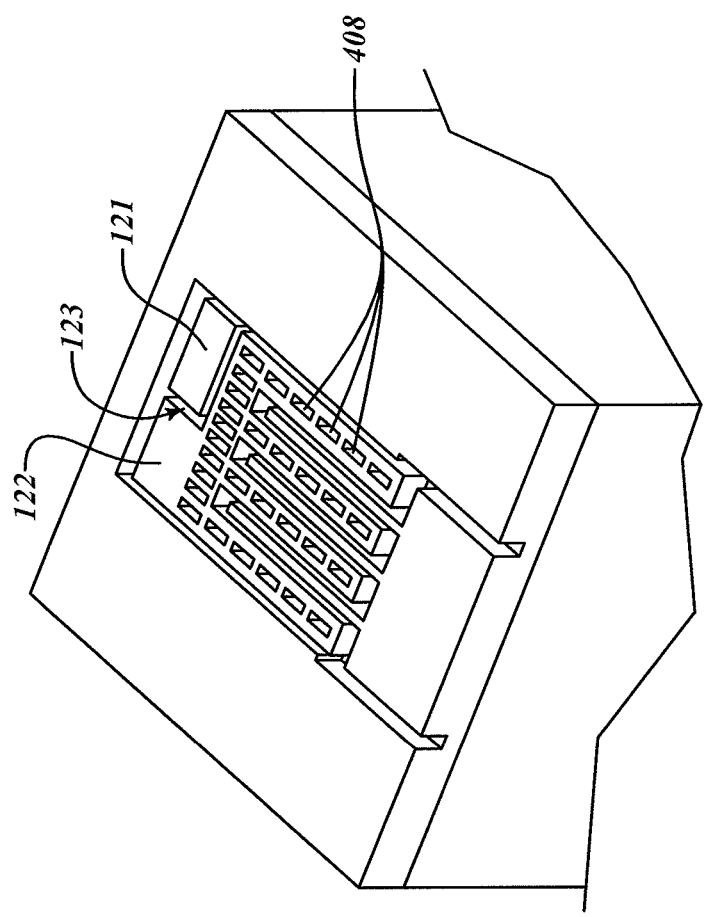

Next at FIGS. 6-6 and 6-7, the second photoresist layer 531 (not shown) is removed, thereby exposing the regions of double oxide layer thickness 530 and the regions of bare silicon 504 between them. Next, areas of the silicon layer 504 unshielded by either single or double oxide layers 516, 520 are exposed to a second timed DRIE for a duration sufficient to remove approximately one half the thickness of the silicon layer 504. For the gap 400 previously etched (as shown in FIG. 6-4) to a depth of half the thickness of the silicon layer 504, the depth of the gap 400 is lowered all the way to the insulator layer 508. For regions of the silicon layer 504 previously shielded by the second photoresist layer 531, the second timed DRIE removes the silicon layer 504 to a depth of approximately one half the thickness of the silicon layer 504. This step etches the passageways 408 in eventual lower stator tines 136 to provide access to etch the upper/lower stator tine gap 404. In this second timed DRIE, one half of the depth of the vertical gap 123 that eventually separates the upper stator tine base 121 from the lower stator tine base 122 also becomes etched.

Figures 6, 7, 8:
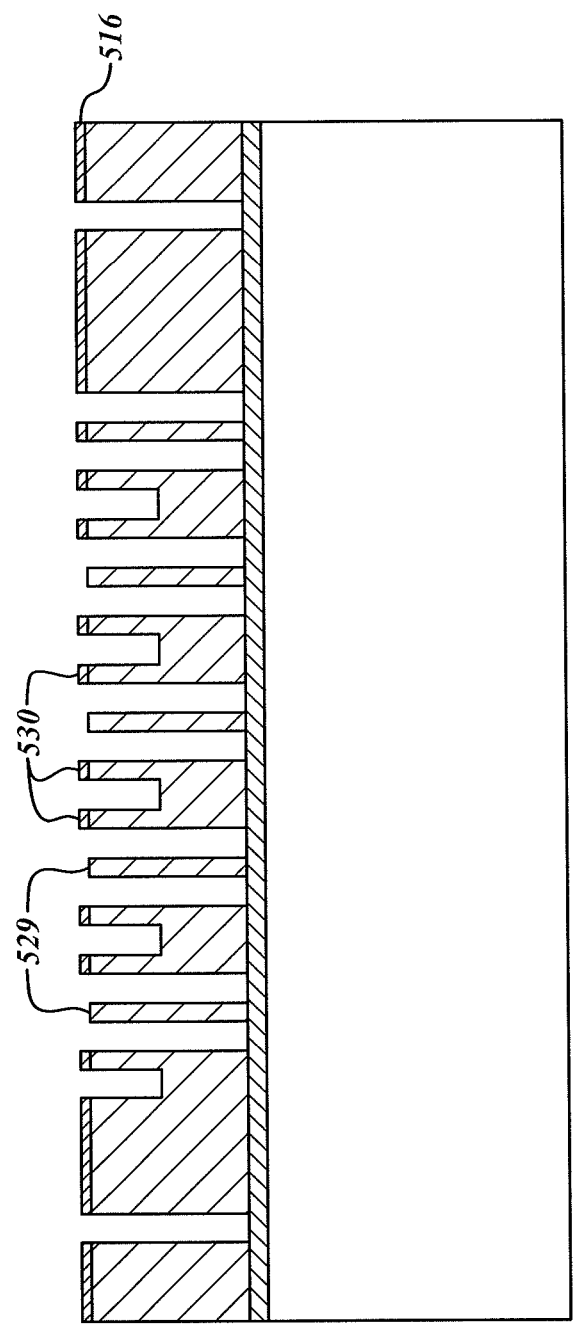
Figures 6, 7, 8, 9:
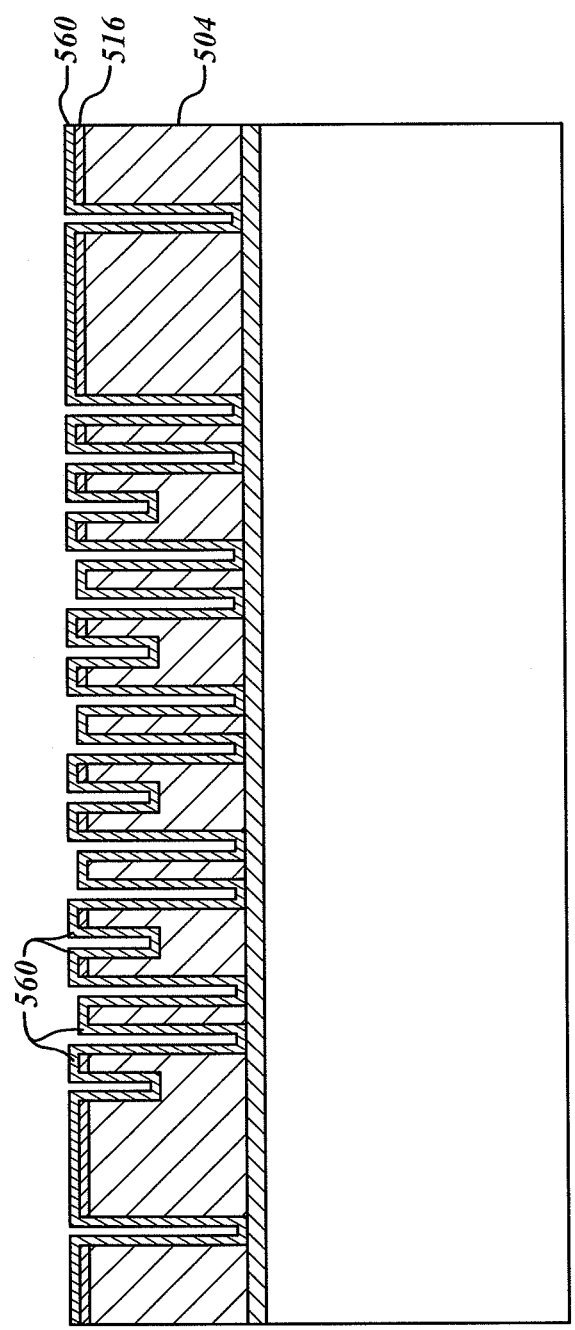
Figures 6, 7, 8, 9, 10:
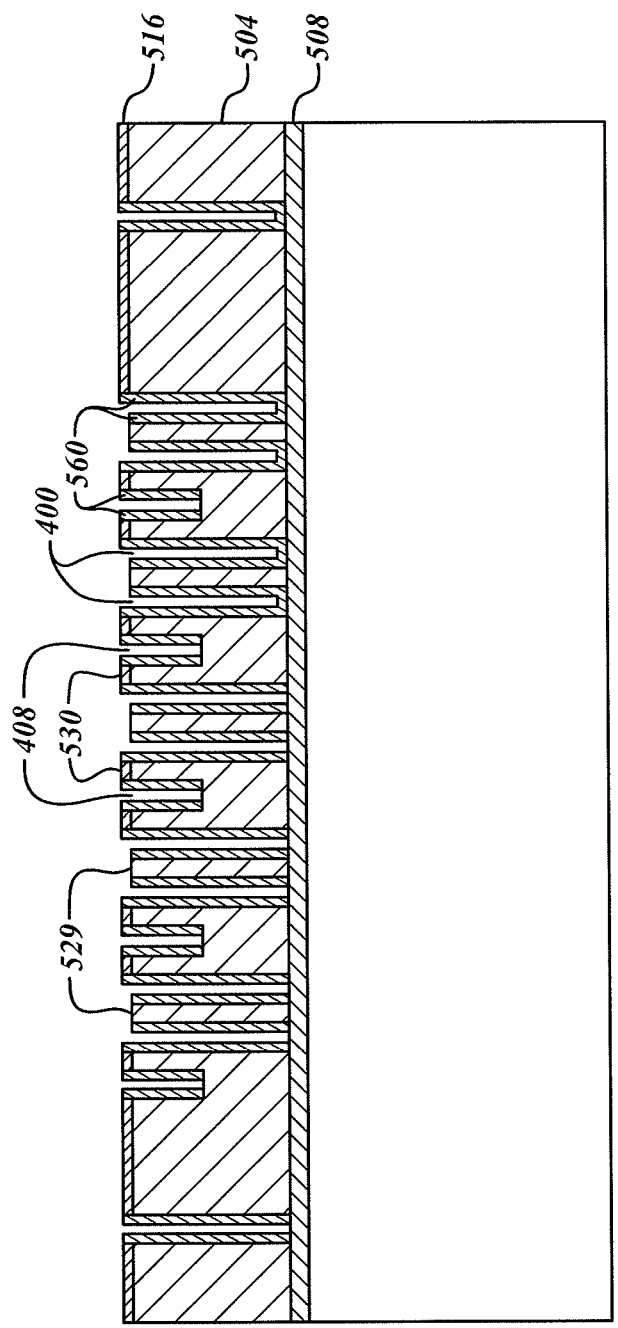
Figures 6, 7, 8, 9, 10, 11:
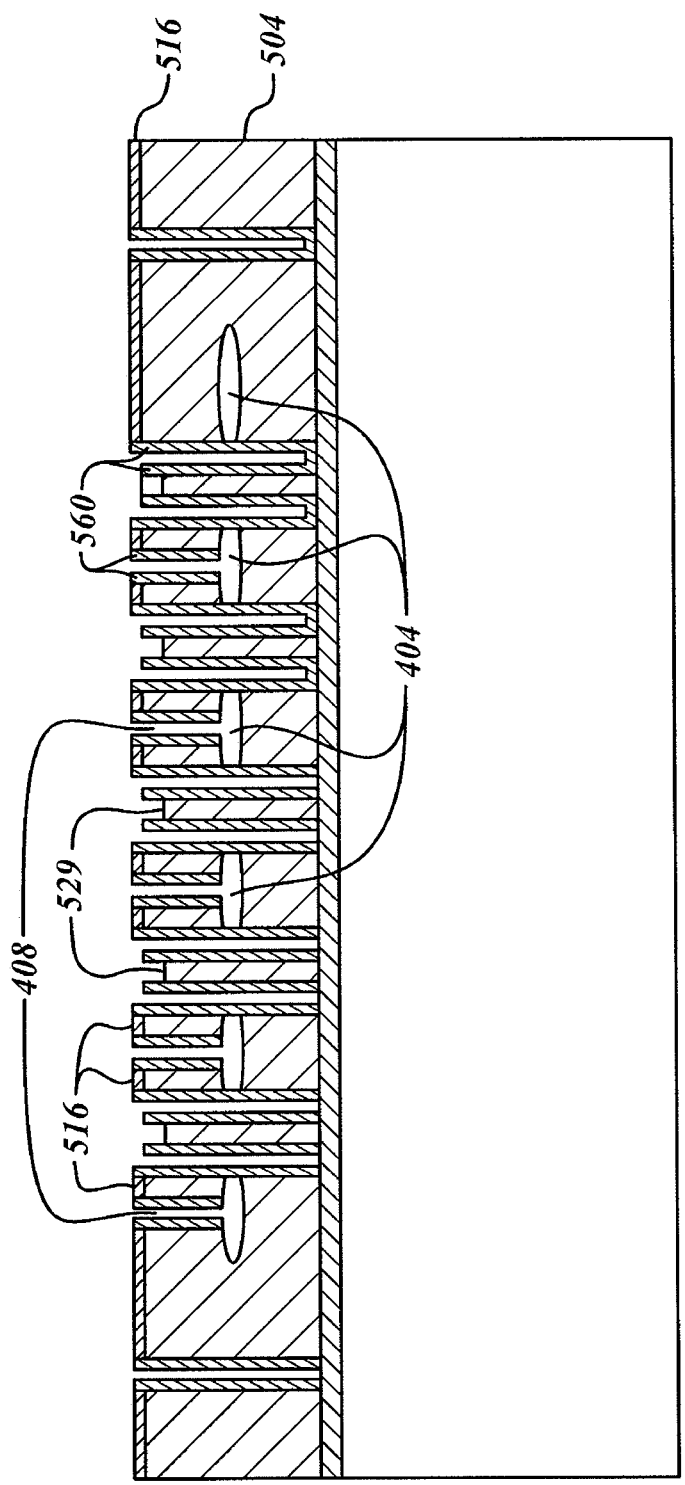
Figures 6, 7, 8, 9, 10, 11, 12:
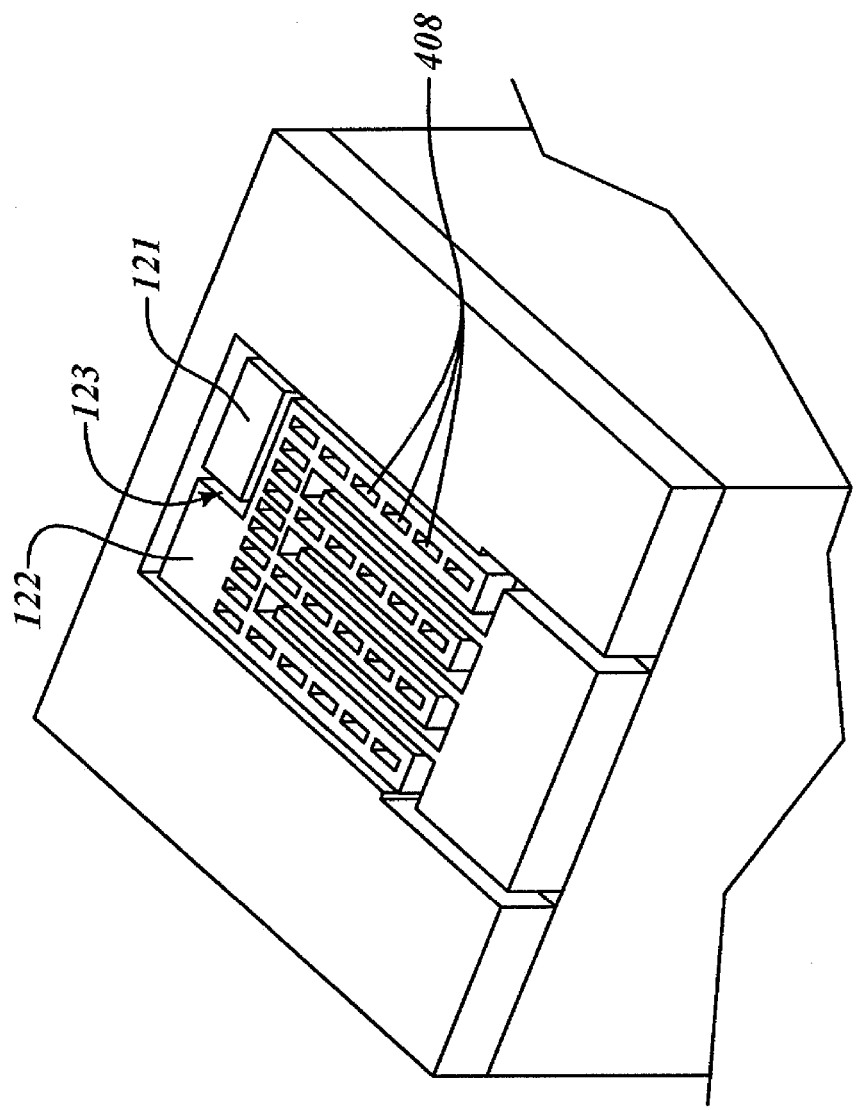
Figures 6, 7, 8, 9, 10, 11, 12, 13:
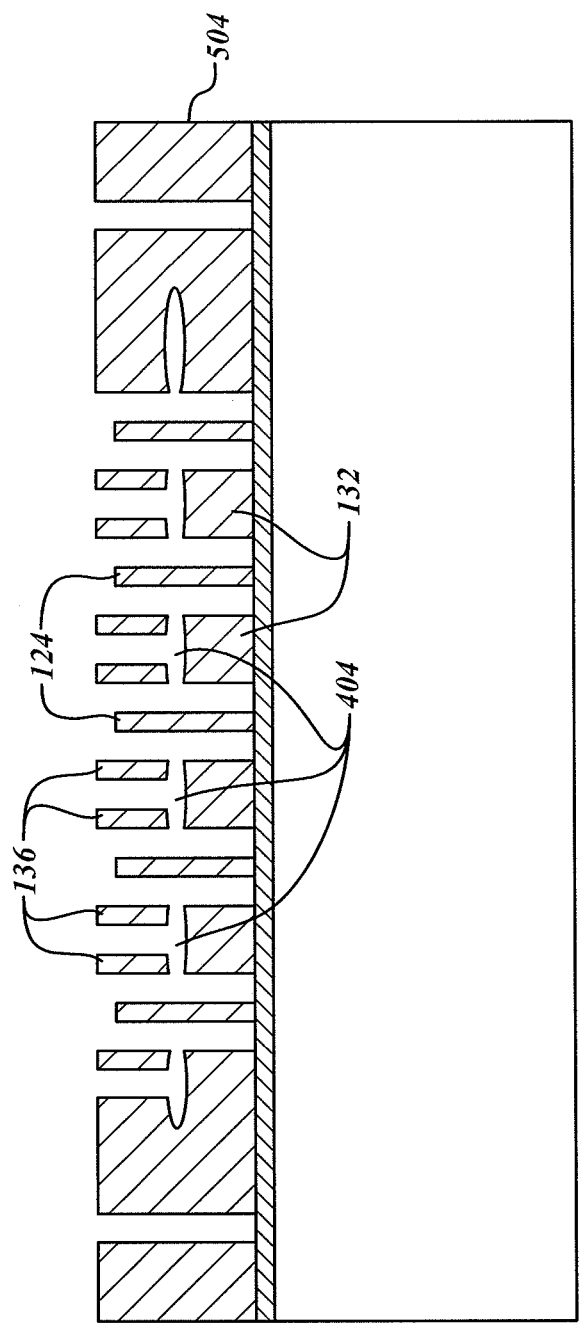
Figures 6, 7, 8, 9, 10, 11, 12, 13, 14:
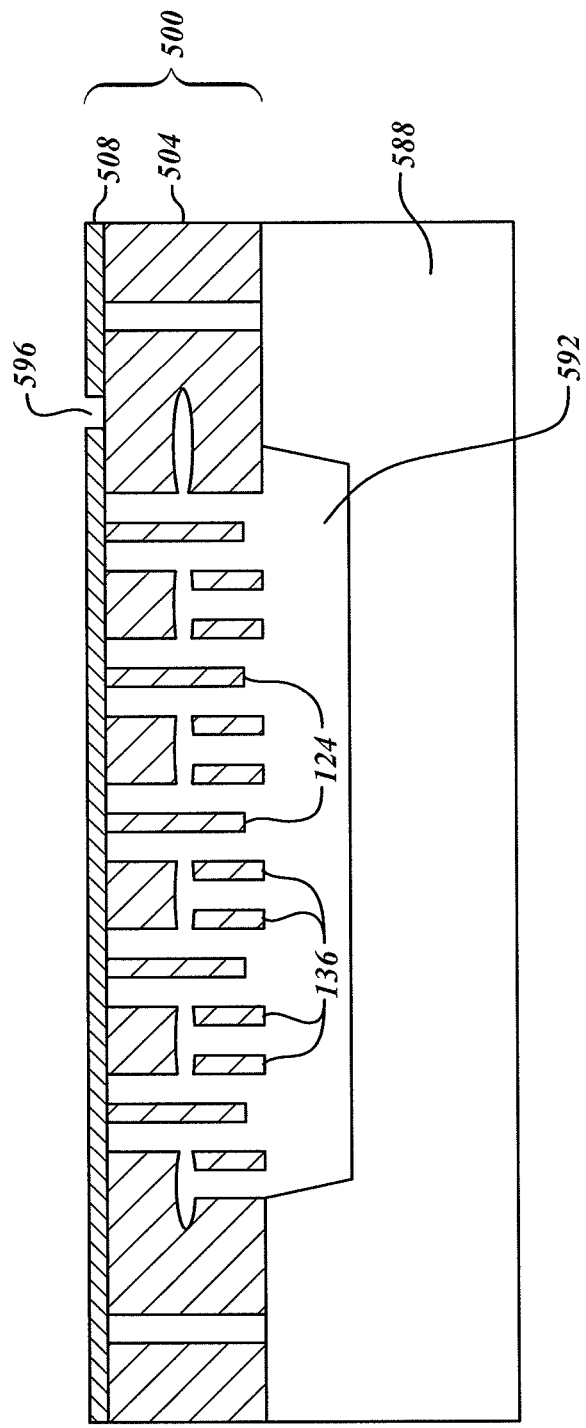
Figures 6, 7, 8, 9, 10, 11, 12, 13, 14, 15:
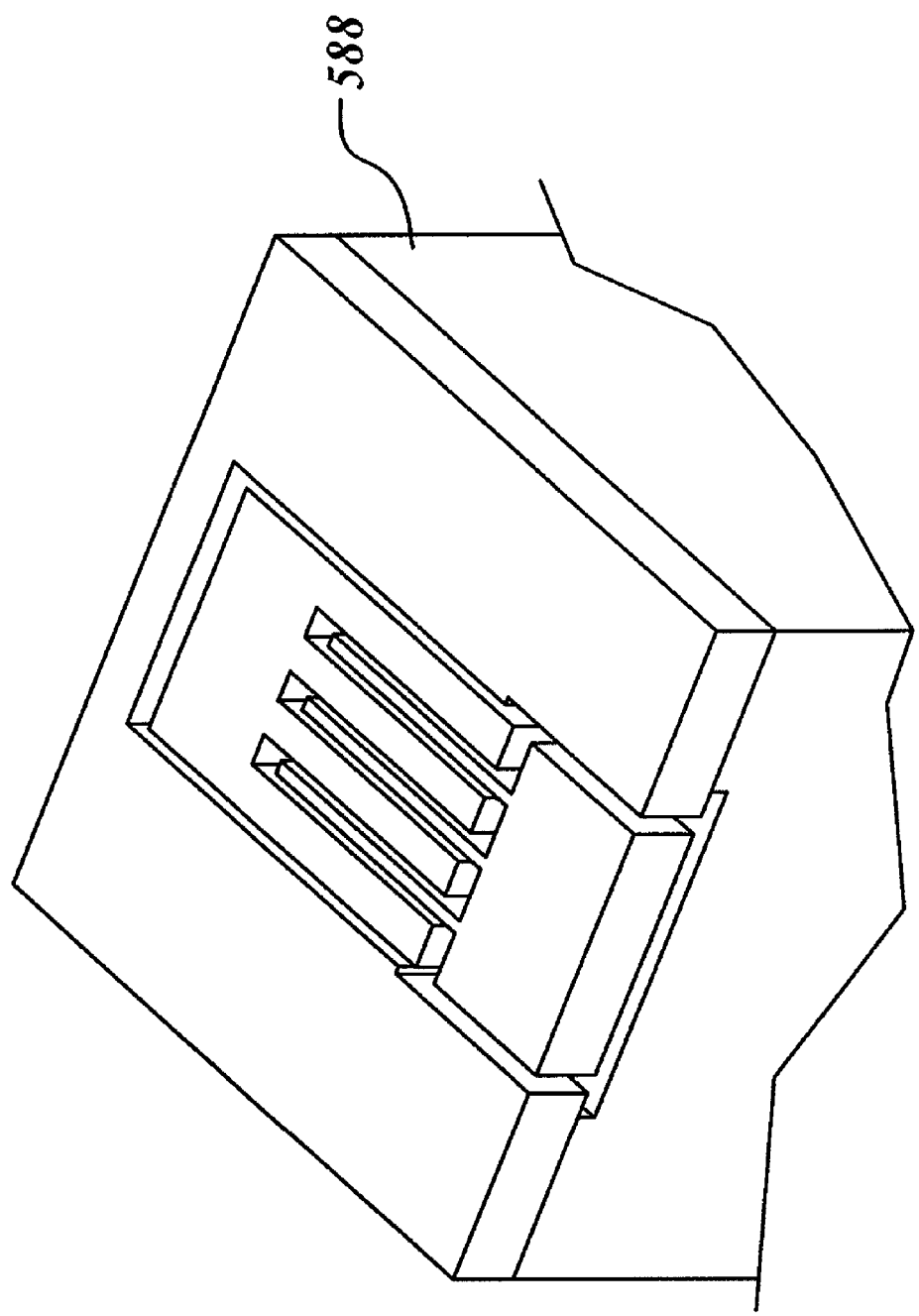
Figures 6, 7, 8, 9, 10, 11, 12, 13, 14, 15, 16:
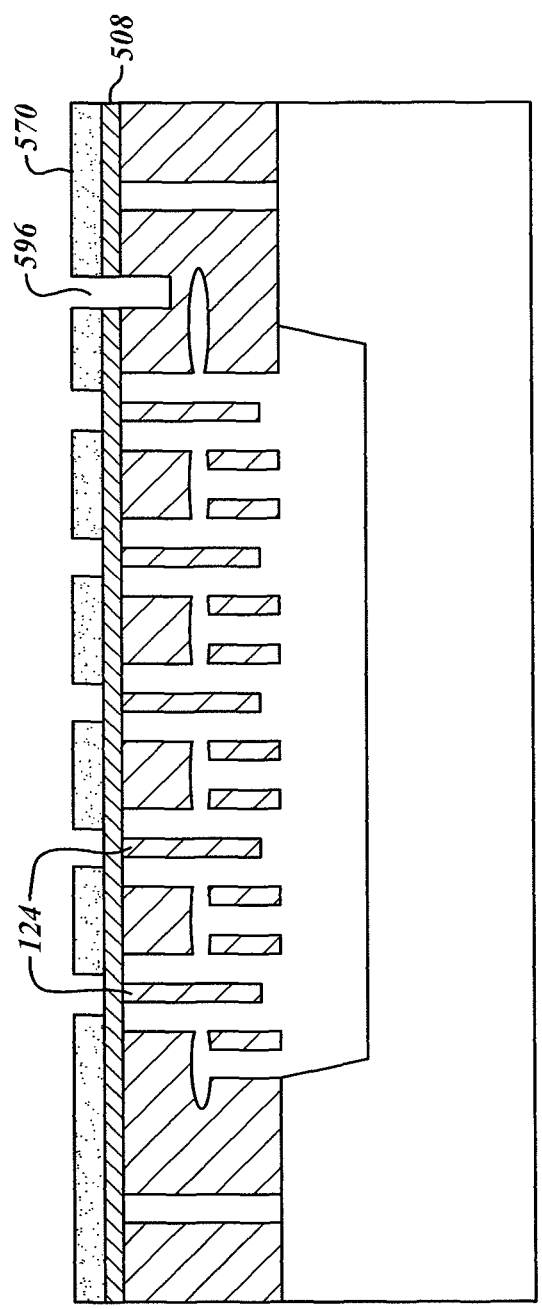
Figures 6, 7, 8, 9, 10, 11, 12, 13, 14, 15, 16, 17:
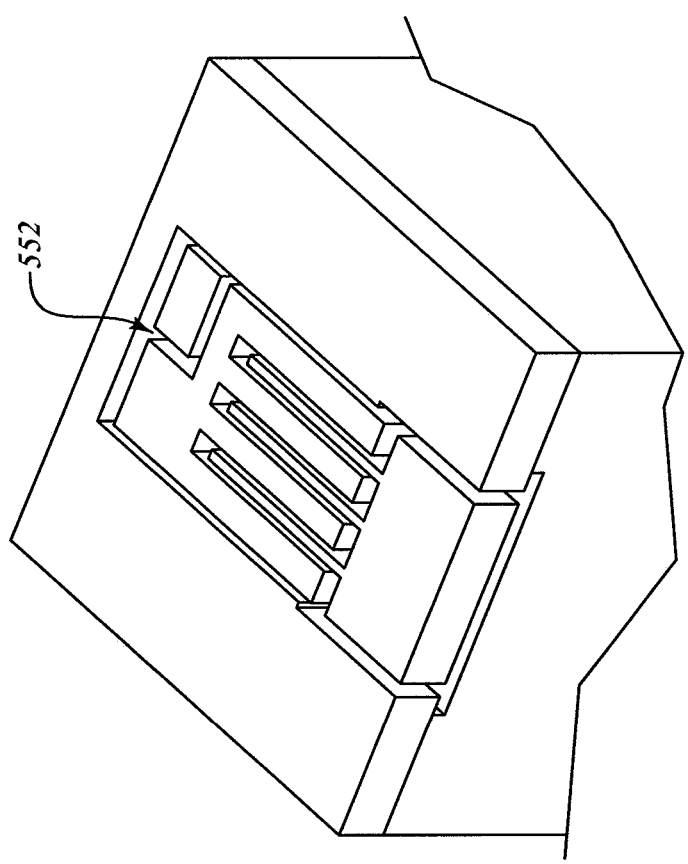
Figures 6, 7, 8, 9, 10, 11, 12, 13, 14, 15, 16, 17, 18:
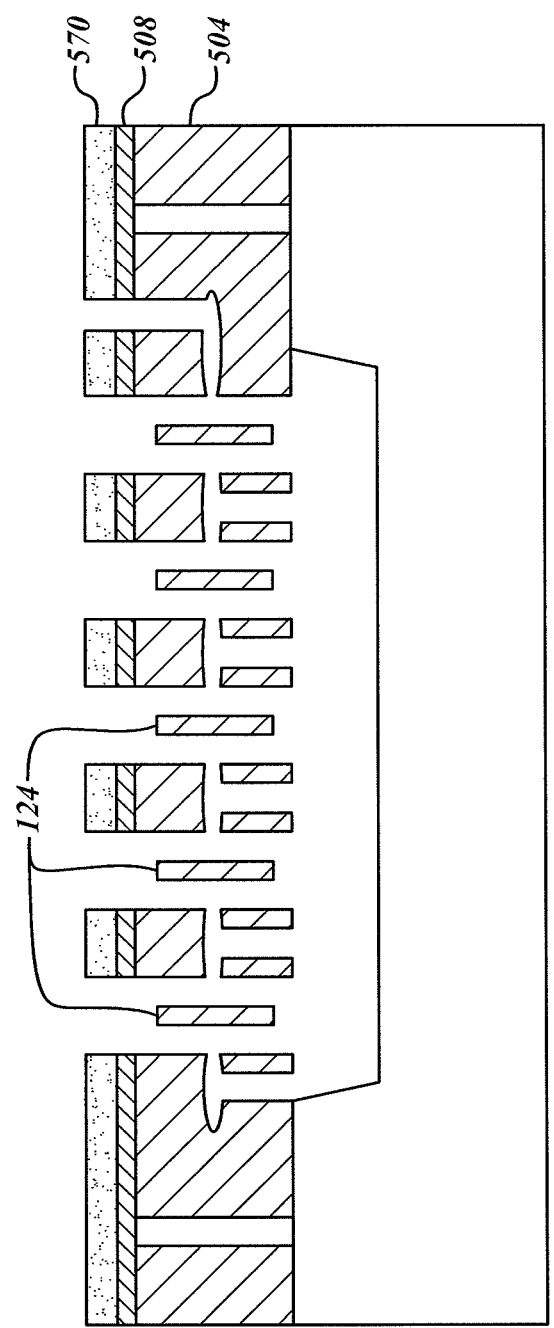
Figures 6, 7, 8, 9, 10, 11, 12, 13, 14, 15, 16, 17, 18, 19:
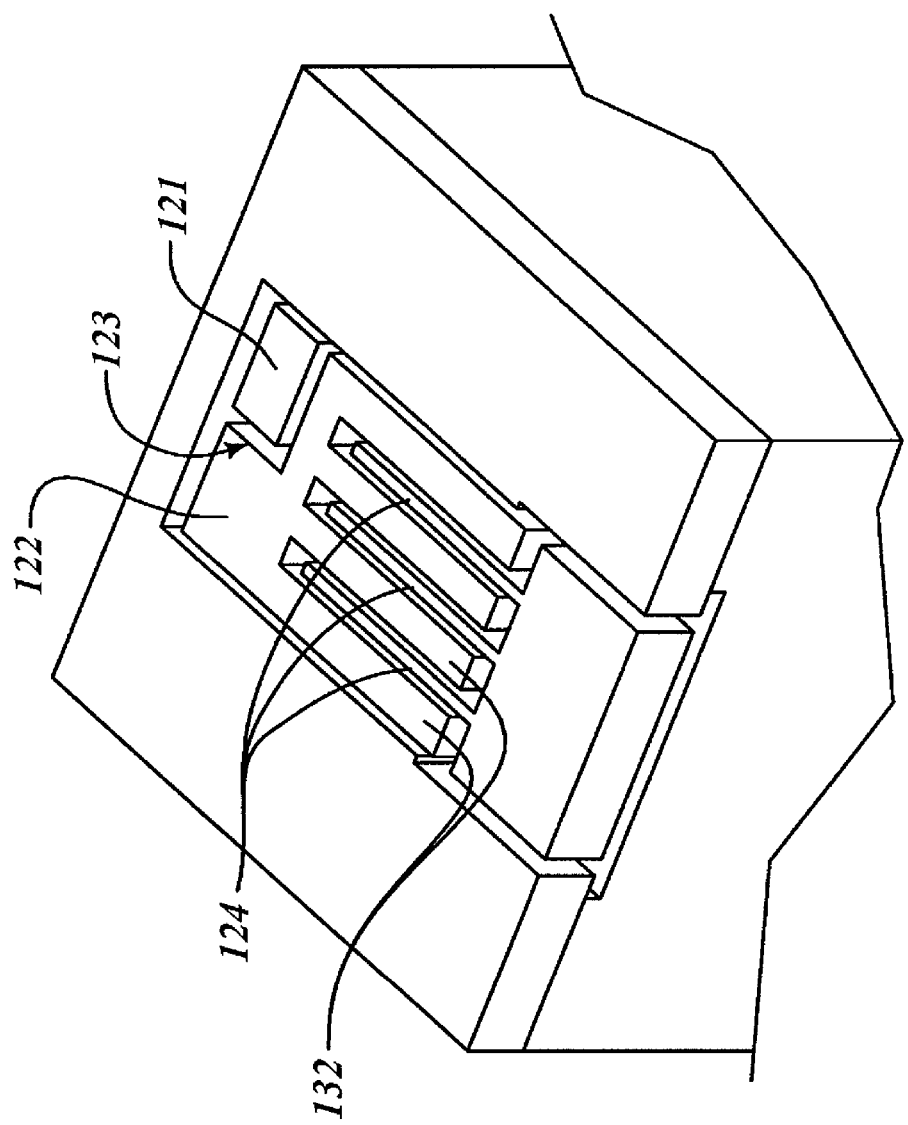
Figures 6, 7, 8, 9, 10, 11, 12, 13, 14, 15, 16, 17, 18, 19, 20:
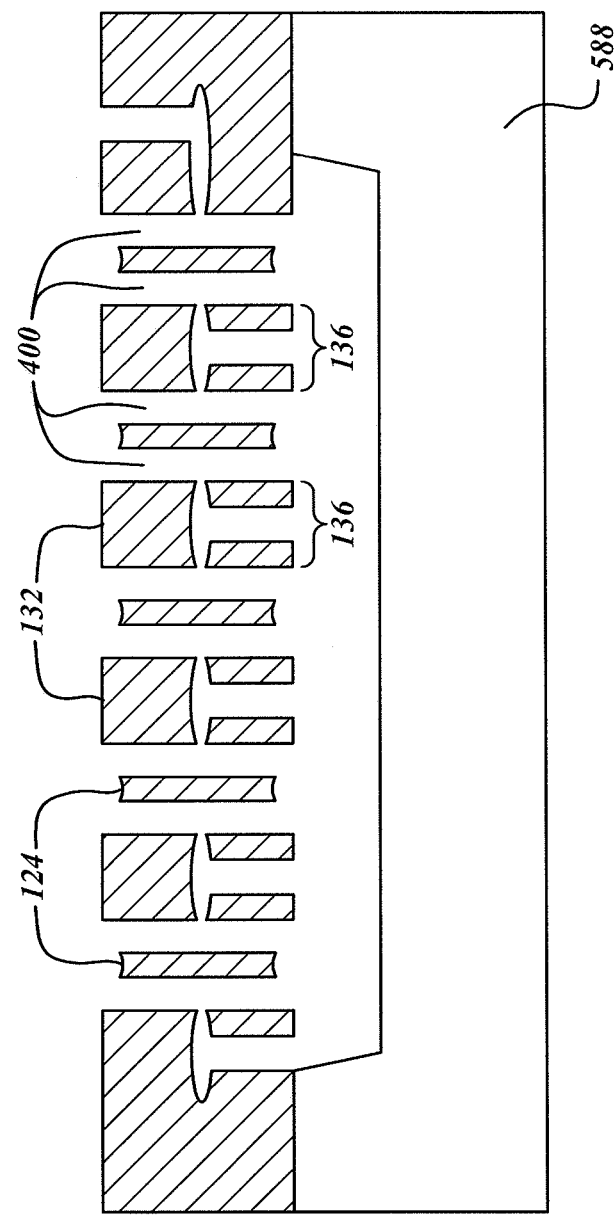

At a FIG. 6-8, the first oxide layer 516 and the second oxide layer 520 (not shown) are exposed to a third oxide etch. The third oxide etch is a timed etch. In the regions of single oxide layer thickness 529, the first oxide layer 516 is removed entirely, exposing the silicon layer 504. In the regions of double oxide layer thickness 530, the second oxide layer 520 is removed, exposing the first oxide layer 516.

At a FIG. 6-9, a third oxide layer 560 is applied to the remaining first oxide layer 516 and the exposed areas of the patterned silicon layer 504. The third oxide layer 560 is applied conformally, so that all horizontal and vertical surfaces receive deposition.

At a FIG. 6-10, the third oxide layer 560 is exposed to a fourth oxide etch. The fourth oxide etch is both timed and directional. In regions of single oxide layer thickness 529, the first oxide layer 516 is removed entirely, re-exposing the silicon layer 504. In regions of double oxide layer thickness 530, the third oxide layer 560 is removed, re-exposing the first oxide layer 516. The single oxide layer 560 at the bottom of the gap 400 is removed, exposing the insulator layer 508. The first oxide layer 516 at the bottom of the passageways 408 is also removed, exposing the silicon layer 504. None of the third oxide layer 560 on vertical services is removed.

At FIGS. 6-11 and 6-12, the regions of the silicon layer 504 unshielded by the first and third oxide layers 516, 560 are exposed to a third DRIE. The third DRIE is timed and also isotropic. The isotropic aspect of the etch causes silicon to be removed from both horizontal and vertical faces of the exposed areas of the silicon layer 504. For the silicon layer 504 exposed at the regions of single oxide layer thickness 529 formerly capped by the first oxide layer 516, the thickness of the silicon layer 504 is slightly reduced. This step reduces the height of the eventual rotor tines 124. For the silicon layer 504 exposed at the bottom of passageways 408, the silicon layer 504 is etched horizontally out to a backside of the third oxide layer 560. This step forms the upper/lower stator tine gap 404 that eventually mechanically and electrically isolates the upper and lower rows of stator tines 132, 136.

At a FIG. 6-13, the remaining portions of the first and third oxide layers 516, 560 (not shown) are removed from the patterned silicon layer 504 by a fifth oxide etch.

At FIG. 6-14, the patterned silicon-on-insulator wafer 500 is flipped and bonded to a glass wafer 588. The glass wafer 588 has a wafer clearance space 592 that provides clearance to the patterned portions of the silicon layer 504, especially in the region of the rotor tines 124 and the lower stator tines 136. Next the handle layer 512 (not shown) is removed, exposing the face of the insulator layer 508 formerly facing the handle layer 512 (not shown). Next the insulator layer 508 is patterned by a sixth oxide etch to expose the silicon layer 504 in the region of the perimeter channel 596, where the upper stator tines 132 eventually become separated from the lower stator tines 136, and the silicon layer 504 where the vertical gap 123 eventually separates the upper and lower stator tine bases 121, 122 (not shown).

At FIGS. 6-15 and 6-16, a fourth timed anisotropic DRIE etches to a depth partially through silicon layer 504, thereby deepening the perimeter channel 596 and the vertical gap 123. Next a third photoresist layer 570 is applied to the insulator layer 508. The third photoresist layer 570 is then patterned to expose regions of the insulator layer 508 positioned above the eventual rotor tines 124 and the gaps 400.

At FIGS. 6-17 and 6-18, a seventh oxide etch is applied to the areas of the insulator layer 508 exposed by patterning the third photoresist layer 570. This step removes any of the insulator layer 508 not shielded by the third photoresist layer 570. Next, the silicon layer 504 is exposed to a fifth DRIE. The fifth DRIE is timed, but not isotropic. This step reduces the height of the rotor tines 124 and completes the vertical gap 123 started in FIGS. 6-6 and 6-7 and extended in FIGS. 6-15 and 6-16 to separate the upper and lower stator tine bases 121, 122. This operation fully separates, mechanically and electrically, the upper stator tines 132 and the upper stator tine base 121 from the lower stator tines 136 (not visible) and the lower stator tine base 122.

At a FIG. 6-20, the third photoresist layer 570 (not shown) and the remaining portions of the insulating layer 508 (not shown) are fully removed.

While the preferred embodiment of the invention has been illustrated and described, as noted above, many changes can be made without departing from the spirit and scope of the invention. For example, alternative steps and methods for creating the two parallel rows of stator tines are considered within the invention's scope. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An out-of-plane electrostatic comb drive accelerometer comprising:
    a proof mass;
    a single material layer comprising:
        a first plurality of rotor comb tines located at an edge of the proof mass;
        a first plurality of stator comb tines interleaved with the plurality of rotor comb tines; and
        a second plurality of stator comb tines interleaved with the plurality of rotor comb tines, wherein the first and second pluralities of stator comb tines are electrically isolated from one another,
    wherein the first plurality of stator comb tines are located in a first plane and the second plurality of stator comb tines are located in a second plane, wherein the first and second planes are not the same.

2. The accelerometer of claim 1, wherein at least one tine of the first plurality of stator comb tines is in substantial alignment with at least one tine of the second plurality of stator comb tines in the out-of-plane direction.

3. The accelerometer of claim 1, wherein at least a portion of the first plurality of stator comb tines are aligned in substantially the same direction in a first plane, forming a first row, and wherein at least a portion of the second plurality of stator comb tines are aligned in substantially the same direction in a second same plane, forming a second row.

4. The accelerometer of claim 3, wherein the first plurality of stator comb tines forming a first row and the second plurality of stator comb tines forming the second row are substantially in alignment with one another.

5. The accelerometer of claim 3, wherein the first and second planes are substantially in parallel.

6. The accelerometer of claim 3, wherein the first plurality of stator comb tines forming the first row and the second plurality of stator comb tines forming the second row are separated by a space.

7. The accelerometer of claim 1, wherein the first plurality of stator comb tines is supported by an upper stator tine base, wherein the second plurality of stator comb tines is supported by a lower stator tine base, and wherein the upper and lower stator tine bases are mechanically and electrically isolated.

8. The accelerometer of claim 7, wherein the upper and lower stator tine bases are substantially the same thickness.

9. The accelerometer of claim 1, wherein a thickness of an individual rotor comb tines is greater than a thickness of an individual stator comb tine.

10. The accelerometer of claim 1, wherein a first gap defines a first capacitance between the plurality of rotor comb tines and the first plurality of stator comb tines, wherein a second gap defines a second capacitance between the plurality of rotor comb tines and the second plurality of stator comb tines, and wherein a linear out-of-plane acceleration of the proof mass generates a torque about a rotational axis of the proof mass that changes the first capacitance and the second capacitance.

11. The accelerometer of claim 1, wherein a first voltage applied to the first plurality of stator comb tines pulls the rotor comb tines toward the first plurality of stator comb tines and a second voltage subsequently applied to the second plurality of stator comb tines pulls the rotor comb tines in an opposing direction toward the second plurality of stator comb tines.

12. The accelerometer of claim 1, further comprising:
    a second plurality of rotor comb tines at a second edge of the proof mass;
    a third plurality of stator comb tines interleaved with the second plurality of rotor comb tines; and
    a fourth plurality of stator comb tines interleaved with the second plurality of rotor comb tines, wherein the third and fourth pluralities of stator comb tines are electrically isolated from one another, and wherein the third and fourth pluralities of stator comb tines are made from a single material layer.

13. The accelerometer of claim 1, further comprising a controller configured to apply a voltage to at least one of the plurality of interleaved rotor comb tines and stator comb tines, wherein the voltage changes a rebalancing force that opposes a rotational torque of the proof mass generated in response to an out-of-plane acceleration of the proof mass, wherein the controller is configured to determine an amount of acceleration based upon the applied voltage.

14. The accelerometer of claim 13, further comprising at least one flexure configured to couple the proof mass to an anchor, and configured to define an axis of rotation, wherein the rotational torque is about the axis of rotation.

* * * * *